(12) United States Patent
Jung

(10) Patent No.: US 8,699,845 B2
(45) Date of Patent: Apr. 15, 2014

(54) METHOD AND APPARATUS FOR REPRODUCING DISCONTINUOUS AV DATA

(75) Inventor: Kil-soo Jung, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1174 days.

(21) Appl. No.: 11/754,566

(22) Filed: May 29, 2007

(65) Prior Publication Data

US 2008/0107400 A1    May 8, 2008

(30) Foreign Application Priority Data

Nov. 6, 2006   (KR) ................................ 2006-108837

(51) Int. Cl.
*H04N 5/932* (2006.01)
(52) U.S. Cl.
USPC .......................................... 386/219; 386/201
(58) Field of Classification Search
None
See application file for complete search history.

(56) References Cited

U.S. PATENT DOCUMENTS

| | | | |
|---|---|---|---|
| 5,915,066 A | 6/1999 | Katayama | |
| 5,990,977 A | 11/1999 | Kaneda et al. | |
| 6,081,651 A * | 6/2000 | Kim | 386/329 |
| 2003/0175011 A1 | 9/2003 | Nagai et al. | |
| 2004/0039934 A1* | 2/2004 | Land et al. | 713/200 |
| 2004/0095358 A1* | 5/2004 | Takagi et al. | 345/589 |
| 2004/0156623 A1 | 8/2004 | Kato et al. | |
| 2005/0105888 A1* | 5/2005 | Hamada et al. | 386/95 |
| 2005/0134608 A1* | 6/2005 | Lafon | 345/629 |
| 2006/0031063 A1* | 2/2006 | Ikeya et al. | 704/207 |
| 2006/0110135 A1* | 5/2006 | Kawabata et al. | 386/95 |
| 2006/0166739 A1* | 7/2006 | Lin | 463/39 |
| 2008/0046406 A1* | 2/2008 | Seide et al. | 707/3 |

FOREIGN PATENT DOCUMENTS

| | | |
|---|---|---|
| JP | 2000-4423 | 1/2000 |
| JP | 2003-274367 A | 9/2003 |
| KR | 1999-0057025 A | 7/1999 |
| KR | 10-0254090 B1 | 4/2000 |
| KR | 10-0262238 B1 | 7/2000 |

OTHER PUBLICATIONS

International Search Report and Written Opinion issued in corresponding International Application No. PCT/KR2007/005095 dated Jan. 21, 2008.
Korean Office Action mailed Oct. 2, 2012, issued in counterpart Korean Patent Application No. 10-2006-0108837; 4 pages in Korean language.

\* cited by examiner

*Primary Examiner* — William C Vaughn, Jr.
*Assistant Examiner* — Eileen Adams
(74) *Attorney, Agent, or Firm* — NSIP Law

(57) ABSTRACT

A method and apparatus for continuously reproducing pieces of audio-video (AV) data includes selecting the pieces of AV data by searching a continuous sequence of AV data for the pieces of AV data matching an input keyword with metadata contained in the continuous sequence of AV data, and fading out a piece of AV data of the selected pieces of AV data for a first predetermined duration before ending reproduction of the piece of AV data.

23 Claims, 6 Drawing Sheets

METHOD AND APPARATUS FOR REPRODUCING DISCONTINUOUS AV DATA

CROSS-REFERENCE TO RELATED APPLICATION

This application claims the benefit of Korean Application No. 2006-108837, filed Nov. 6, 2006, in the Korean Intellectual Property Office, the disclosure of which is incorporated herein by reference.

BACKGROUND OF THE INVENTION

1. Field of the Invention

Aspects of the present invention relate to reproduction of audio-video (AV) data, and more particularly, to a method and apparatus for continuously reproducing a plurality of pieces of discontinuous AV data.

2. Description of the Related Art

In the field of audio-video (AV) data reproduction, an application that allows not only conventional sequential reproduction but also continuous reproduction of scenes selected by a user has been introduced.

FIG. 1 is a block diagram of a conventional apparatus to reproduce AV data. Referring to FIG. 1, the apparatus includes a buffer 102 that buffers data read from an information storage medium 101 which stores an application allowing both sequential AV reproduction and reproduction of discontinuous scenes, a navigation manager 103 that controls reproduction of AV data including video data, audio data, and graphic data, interprets application-related data, and controls data reproduction, a graphic decoder 104 that decodes graphic data under control of the navigation manager 103, a video decoder 105 that decodes video data under control of the navigation manager 103, an audio decoder 106 that decodes audio data under control of the navigation manager 103, and an audio-video (AV) renderer 107 that includes a graphics plane 108 to output graphic data decoded by the graphic decoder 104 and a video plane 109 to output video data decoded by the video decoder 105.

In this conventional apparatus to reproduce AV data, the graphic data includes menu data to construct a menu and/or subtitle data to construct a subtitle. The graphics plane may include a plurality of planes to output decoded menu data and/or subtitle data, and may further include an On-Screen Display (OSC) plane to output menu data and/or subtitle data to an OSD screen supported by a reproducing apparatus.

FIG. 2 is a diagram comparing a normal sequential reproduction of scenes with a reproduction of selected scenes. Referring to FIG. 2, in the case of normal play 201, a reproducing apparatus reproduces AV data according to normally increasing output time information. Contrastingly, in the case 202 where a user selects and reproduces desired scenes, the reproducing apparatus continuously reproduces a plurality of pieces of discontinuous AV data in order to reproduce only the selected play items Scene #1, Scene #2, Scene #5, Scene #7, and Scene #9.

FIG. 3 is a diagram illustrating the way in which selected scenes are reproduced in the case 202 shown in FIG. 2, when a conventional apparatus to reproduce AV data is used. Referring to FIG. 3, Scene #1, Scene #2, Scene #5, Scene #7, and Scene #9 selected as illustrated in FIG. 2 are reproduced in a new reproduction sequence. In the arrows shown in FIG. 3, patterns in the arrows represent types of data, musical notes represent musical audio data, and a volume symbol represents dialog audio data. In this case, the plurality of selected discontinuous scenes is reproduced in a sequence different than that of the basic story line of AV data. Thus, a scene change may lead to a rapid change in video data and audio data, thereby causing an unnatural scene change. Also, reproduction may be stopped during a scene change, since the distance of a jump of AV data that is to be read is sufficiently far enough that seamless and continuous reproduction of the selected AV data cannot be guaranteed.

SUMMARY OF THE INVENTION

Aspects of the present invention provide a method and apparatus to seamlessly and continuously reproduce a plurality of pieces of discontinuous audio-video (AV) data with smooth scene changes.

Additional aspects and/or advantages of the invention will be set forth in part in the description which follows and, in part, will be obvious from the description, or may be learned by practice of the invention.

According to an aspect of the present invention, a method of reproducing pieces of audio-video (AV) data located among a continuous sequence of AV data includes selecting the pieces of AV data by searching the continuous sequence of AV data for the pieces of AV data matching an input keyword with metadata contained in the continuous sequence of AV data, and fading out a piece of AV data of the selected pieces of AV data for a first predetermined duration before ending reproduction of the piece of AV data.

According to an aspect, the metadata includes at least one piece of search keyword information and one piece of entry information for each of the pieces of AV data.

According to an aspect, the search keyword information includes keywords according to scene type, character name, or actor name.

According to an aspect, the fading out of the piece of AV data includes fading out a video output outputted from a video plane by controlling a graphics plane related to the video plane.

According to an aspect, the graphics plane covers the video plane.

According to an aspect, the fading out of the video output includes gradually reducing transparency of the graphics plane so that the graphics plane has a predetermined color at a point of time when the reproduction of the first of the pieces of AV data ends.

According to an aspect, the pieces of AV data are discontinuous from each other in relation to the continuous sequence of AV data.

According to an aspect, the method further includes generating reproduction sequence information containing locations or reproduction durations of the pieces of AV data found by the searching, wherein the pieces of AV data are reproduced based on the reproduction sequence information.

According to an aspect, the pieces of AV data are continuously reproduced.

According to another aspect of the present invention, a method of reproducing pieces of audio-video (AV) data located among a continuous sequence of AV data includes selecting the pieces of AV data matching an input keyword with metadata contained in the continuous sequence of AV data, and fading in a piece of AV data of the selected pieces of AV data for a first predetermined duration after beginning reproduction of the piece of AV data.

According to another aspect, the fading in of the piece of AV data includes fading in a video output outputted from a video plane by controlling a graphics plane covering the video plane.

According to another aspect, the fading in of the video output includes gradually increasing transparency of the graphics plane so that no data is output on the graphics plane when the first predetermined duration lapses after the beginning of the reproduction of the piece of AV data.

According to another aspect, the method further includes fading in volume outputted from an audio output by controlling the audio output to increase a volume level for a second predetermined duration after the beginning of the reproduction of the piece of AV data.

According to another aspect of the present invention, an apparatus for reproducing pieces of discontinuous audio-video (AV) data located among a continuous sequence of AV data includes a navigation manager to interpret reproduction sequence information of the pieces of AV data, and to control reproduction of the pieces of AV data based on the interpreted reproduction sequence information, a video decoder controlled by the navigation manager to decode video data included in the pieces of AV data, a graphic decoder controlled by the navigation manager to decode graphic data included in the pieces of AV data, an AV renderer including a video plane to output the video data decoded by the video decoder and a graphics plane to output the graphic data decoded by the graphic decoder, and a graphics plane controller to fade out the video date by controlling the graphics plane for a first predetermined duration before reproduction of a first of the pieces of AV data ends, and to fade in the video data by controlling the graphics plane for a second predetermined duration after reproduction of a second of the pieces of AV data begins.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
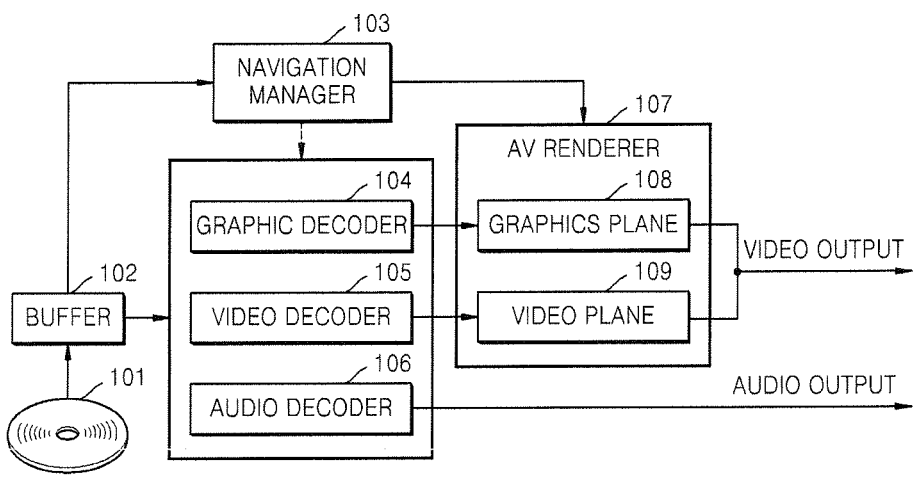
FIG. 1 is a block diagram of a conventional apparatus to reproduce audio-video (AV) data.
Figure 2:
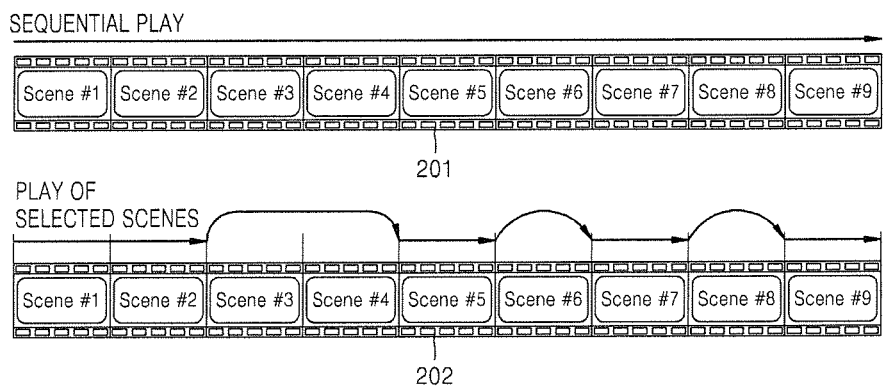
FIG. 2 is a diagram comparing sequential reproduction and reproduction of selected scenes.
Figure 3:
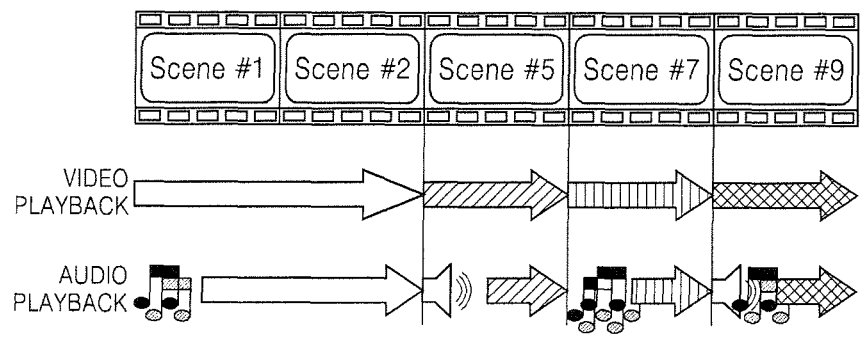
FIG. 3 is a diagram illustrating a way in which selected scenes are reproduced when using the conventional apparatus illustrated in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
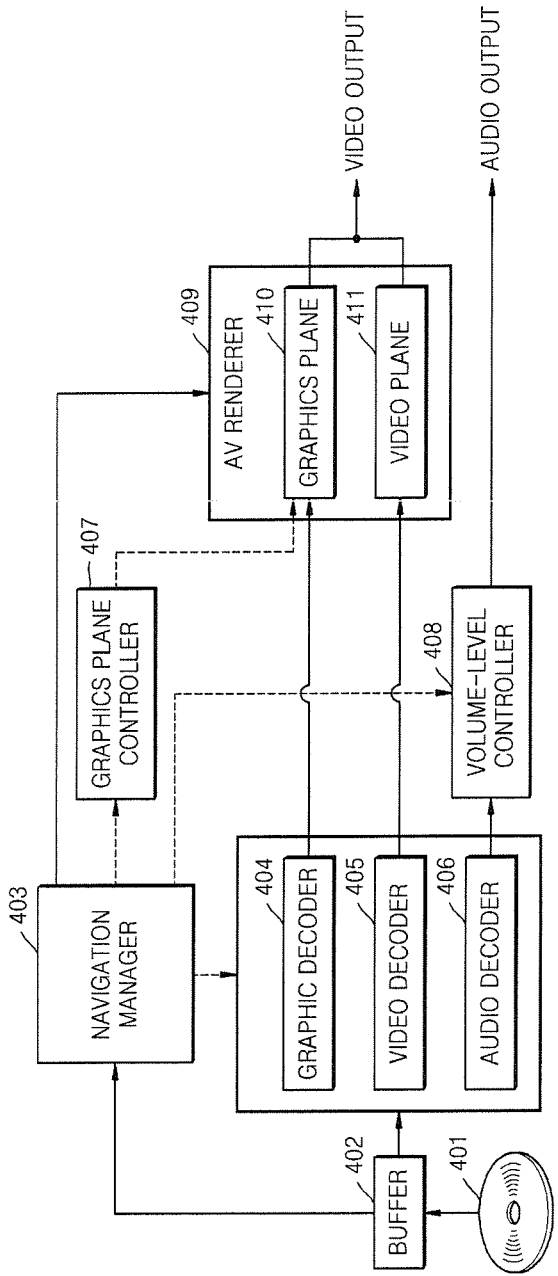
FIG. 4 is a block diagram of an apparatus to reproduce discontinuous AV data, according to an embodiment of the present invention.

FIG. 4 is a block diagram of a reproduction apparatus to reproduce discontinuous audio-video (AV) data, according to an embodiment of the present invention. Referring to FIG. 4, the reproduction apparatus includes a navigation manager 403 that interprets reproduction sequence information of a plurality of pieces of discontinuous AV data and controls reproduction of the AV data according to the reproduction sequence information, a graphic decoder 404 that processes graphic data included in the AV data under the control of the navigation manager 403, a video decoder 405 that processes video data included in the AV data under the control of the navigation manager 403, an audio decoder 406 that decodes audio data included in the AV data under the control of the navigation manager 403, and an audio-video (AV) renderer 409 that includes a video plane 411 to output video data decoded by the video decoder 405, and a graphics plane 410 to output graphic data decoded by the graphic decoder 404. The reproducing apparatus further includes a graphics plane controller 407 and a volume-level controller 408. Also, the reproducing apparatus may include a reading unit (not shown) that reads AV data from a storage device (or an information storage medium) 401, and a buffer 402 that buffers the read AV data. However, the buffer 402 may not be required when the speed of reading the AV data is high.

The graphics plane controller 407 performs a scene change for a video output and the volume-level controller 408 performs a scene change for an audio output, under the control of the navigation manager 403. A scene change occurs when there is a switch from one piece of AV data to another from among a plurality of pieces of AV data while the plurality of the pieces of the AV data are reproduced in a basic sequence, randomly, or in a sequence determined by a user. The graphics plane controller 407 and the volume-level controller 408 will be described later with reference to FIGS. 5 and 6.

In an embodiment of the present invention, the reproduction apparatus may further include an input unit (not shown) through which scenes, a plurality of pieces of AV data, or a search word to search for the scenes or the plurality of pieces of the AV data is inputted from a user, and a search unit (or a search application) (not shown) that searches for the scenes (or the plurality of pieces of the AV data), which are to be continuously reproduced, based on the search word received via the input unit, and that generates reproduction sequence information including information regarding the locations and/or reproduction durations of the selected scenes (or the selected AV data) or the searched for scenes (or the searched for AV data). The navigation manager 403 interprets the reproduction sequence information received from the search unit, and performs a scene change and reproduction by controlling the graphics plane controller 407, the volume-level controller 408, and the decoders 404, 405, and 406 based on the interpreted result. The input unit may be a keyboard, a touch pad, a mouse, a remote control transmitter and receiver, or various other input units.

Figure 5:
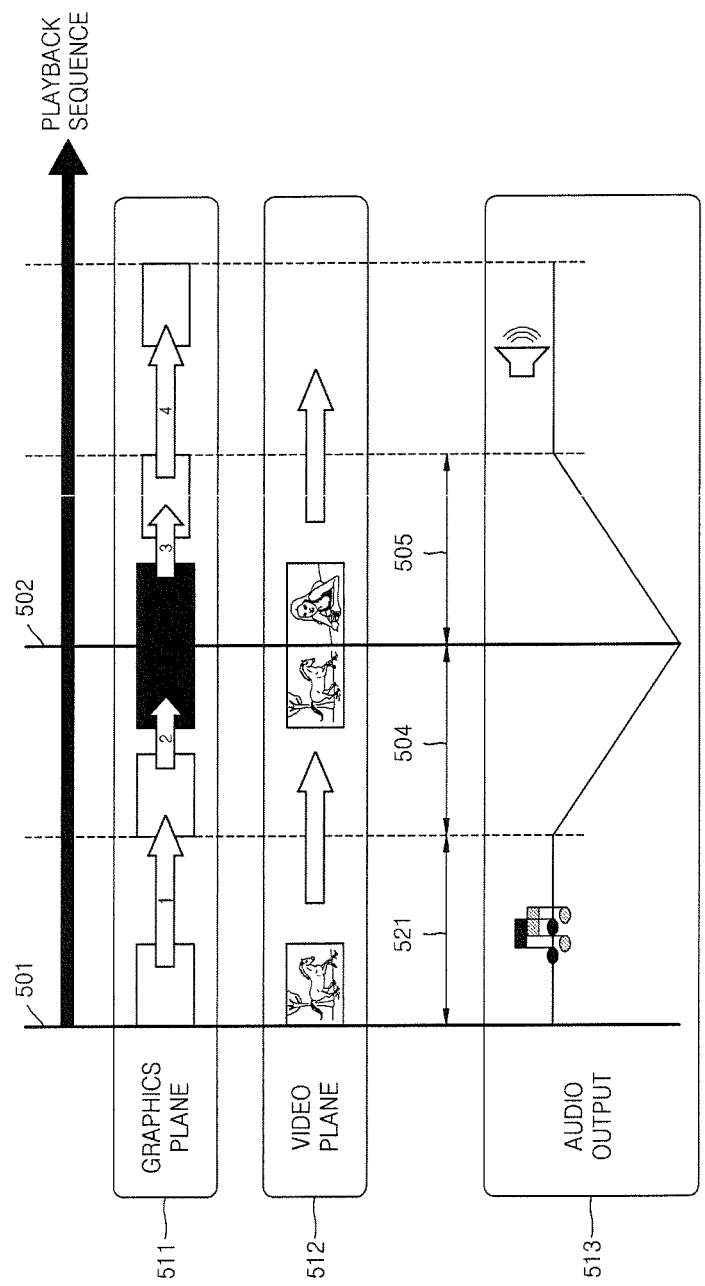
FIG. 5 is a diagram illustrating a method to continuously reproduce a plurality of pieces of discontinuous AV data using the apparatus illustrated in FIG. 4, according to an embodiment of the present invention.

FIG. 5 is a diagram illustrating a method to continuously reproduce a plurality of pieces of discontinuous AV data using the apparatus illustrated in FIG. 4, according to an embodiment of the present invention. Referring to FIG. 5, reproduction of first AV data starts at a first point of time 501 and ends at a second point of time 502, and reproduction of second AV data, which is discontinuous in relation to the first AV data, starts at the second point of time 502. Also, FIG. 5 illustrates an output result 511 on the graphics plane 410, an output result 512 on the video plane 411, and an output result 513 of an audio output, as generated from the first point of time 501.

Reproduction of video data and audio data included in the first AV data starts at the first point of time 501 according to reproduction sequence information inputted by a user, and no data is output on the graphics plane 410 in a section 521 before a section 504 where a scene change starts. Here, the graphics plane 410 may be a plane other than the main video plane 411, such as an On-Screen Display (OSD) plane, a subtitle plane, a menu graphics plane, or a sub graphics plane. The graphics plane controller 407 receives information on reproduction durations of the first AV data and the second AV data from the navigation manager 403, fades out a video output from the AV renderer 409 by controlling the graphics plane 410 for a first predetermined duration 504 before the second point of time 502 and fades in the video output by controlling the graphics plane 410 for a second predetermined duration 505 after the second point of time 502. The first and second predetermined durations 504 and 505 may be the same duration or different durations.

The transparency of the graphics plane 410 is 100% when the first predetermined duration 504 begins. The graphics plane controller 407 gradually reduces the transparency of the graphics plane 410 during the first predetermined duration so that the transparency becomes 0% at the point of time 502 when reproduction of the first AV data ends. As the transparency of, the graphics plane 510 is reduced to 0%, the graphics plane 510 correspondingly turns opaque and has a predetermined color at the second point of time 502, and thus, the video output from the AV renderer 409 is faded out. The effect of fading in and out may be designed to take many different visual forms. For example, each pixel on a screen may simultaneously fade in and out together. Alternatively, some pixels may fade in and out before other pixels fade in and out on the screen.

After reproduction of the second AV data starts, the transparency of the graphics plane 410 is gradually increased so that the transparency becomes 100% when the second predetermined duration 505 ends. When the transparency of the graphics plane 410 is increased to 100%, the data output on the graphics plane 410 is correspondingly reduced to 0%, and therefore, the video output from the AV renderer 409 is faded in and normally output. In this case, an output on the video plane 411 is the same as when a sequential reproduction method is used, and only the graphics plane 410 is controlled to sequentially fade the video output in and out. It is understood that the output of the video plane 411 and the graphics plane 410 may be outputted to various types of external displays, such as television monitors, computer screens, handheld video recording devices, etc.

The volume-level controller 408 receives the information regarding the reproduction durations of the first AV data and the second AV data from the navigation manager 403, fades out the volume by controlling the audio output of the audio decoder 406 to decrease the volume for the predetermined duration 504 before the second point of time 502, and fades in the volume by controlling the audio output to increase the volume for the predetermined duration 505 after the second point of time 502. Thus, the audio output of the first AV data is gradually reduced to fade away at the point of time 502 when reproduction of the second AV data begins, and is normalized after the reproduction of the second AV data begins. Accordingly, as illustrated in FIG. 5, it is possible to perform a smooth scene change without a rapid audio change, even when there is a switch from two completely different types of audio, such as a switch from music to a human's voice. Preferably, an interval of time between when the audio output is faded out and when the audio output is faded are respectively set to be equal to an interval of time between when the video output is faded out and when the video output is faded in. However, the intervals of time during which the audio output is faded in and out do not need to be set to be equal to the intervals of time during which the video output is faded in and out.

Figure 6:
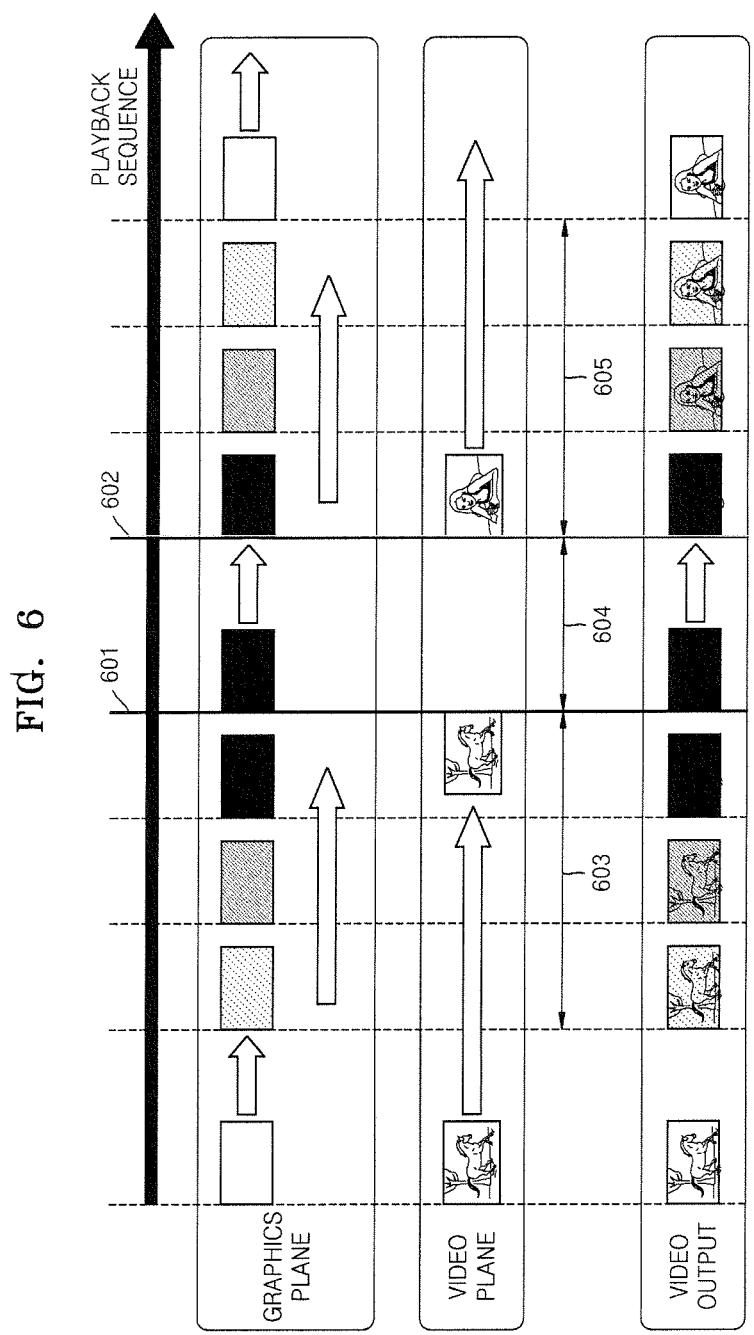
FIG. 6 is a diagram illustrating a method to continuous reproduce a plurality of pieces of discontinuous AV data using the apparatus illustrated in FIG. 4, according to another embodiment of the present invention.

FIG. 6 is a diagram illustrating a method to continuously reproduce a plurality of pieces of discontinuous AV data using the apparatus illustrated in FIG. 4, according to another embodiment of the present invention. In addition to using the effect of fading a video output and an audio output in and out as illustrated in FIG. 5, the method of FIG. 6 also prevents a discontinuity in reproduction caused by buffer underflow due to the distance of a jump of the reading unit when switching from one piece of AV data to another. The navigation manager 403 controls the video decoder 405 and/or the audio decoder 406 to stop data from being decoded for a predetermined duration of time 604 from a point of time 601 when reproduction of first AV data ends to a point of time 602 when reproduction of second AV data begins, and controls a reading unit to read out the second AV data from the information storage medium 401 and store the read data in the buffer 402. That is, the video output and the audio output are faded out for a predetermined duration 603 before reproduction of the first AV data ends, the second AV data, which is to be subsequently reproduced, is read for the predetermined duration 604 while displaying a color representing that the video output is fading out via the graphics plane controller 407, and the video output and the audio output are faded in at the start of reproduction of the second AV data for a predetermined duration 605. For instance, a blue screen or a picture other than an AV picture representing that the reproduction of the first AV data has ended is output by the graphics plane 410 in a duration 604 between when the first AV data is reproduced and when the second AV data is reproduced.

Figure 7:
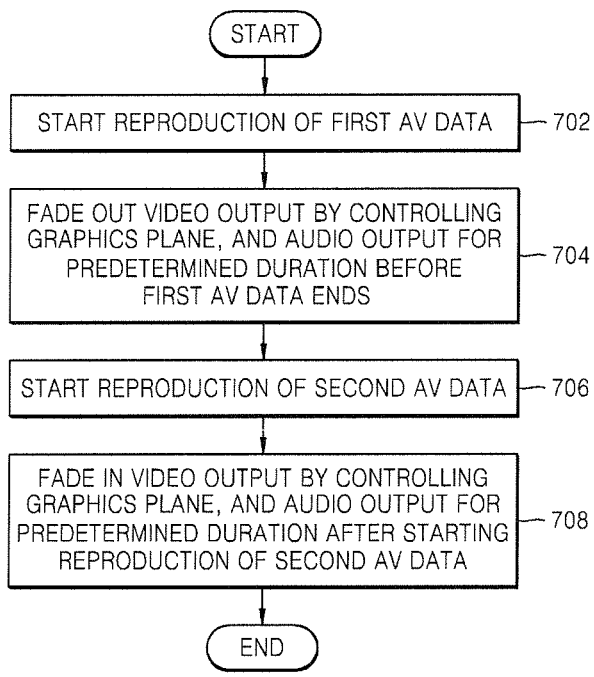
FIG. 7 is a flowchart of a method of reproducing discontinuous AV data, according to another embodiment of the present invention.

FIG. 7 is a flowchart of a method of reproducing discontinuous AV data according to another embodiment of the present invention. First, a search application is executed, whereby a desired scene or AV data is received from a user, selected and reproduced. If the user selects a desired scene or AV data or inputs a search word via the search application, the search application searches for the scenes or pieces of AV data corresponding to the input key word and generates reproduction sequence information that includes information regarding the durations and/or locations of the searched scenes or AV data. Preferably, the discontinuous scenes or pieces of AV data selected by a user are reproduced continuously. However, it is understood that a user may also reproduce the AV data in discontinuous ways.

The search unit preferably uses metadata corresponding to the AV data in order to search for a desired scene. The metadata is defined in units of scenes that can be arbitrarily determined by a manufacturer. The metadata contains at least one piece of search keyword information and entry point information for each scene, and may further include information regarding a reproduction duration of each scene. The search keyword information includes keywords according to scene type, character, actor, or other search criteria arbitrarily determined by a manufacturer. The search application searches for scenes matching a keyword input by the user by searching through the metadata, and generates reproduction sequence information to reproduce the scenes found by the search unit, based on the entry point and/or the reproduction duration information as determined by the user.

In this case, it is preferable to display a list of scenes found by the search unit on a user interface, allow the user to select scenes from the user interface that the user wants to reproduce, and generate reproduction sequence information regarding the selected scenes. It is understood that the user is not required to select scenes from among the scenes found by the search unit, and instead may reproduce each of these scenes. Also, scenes found by the search unit or scenes selected from the scenes found by the search unit can be reproduced sequentially, randomly, or in an order determined by the user, and information regarding the manner of reproducing the searched for or selected scenes is also included in the reproduction sequence information.

The navigation manager 403 reads out the first AV data, which is reproduced first, to the buffer 402, and controls the decoders 404, 405, and 406, along with the AV renderer 409, in order to decode and reproduce the read data based on the generated reproduction sequence information. In this way, reproduction of the first AV data begins at operation 702.

During the reproduction of the first AV data, the navigation manager 403 controls the graphics plane controller 407 and/or the volume-level controller 408 to operate at a point of time when the remaining reproduction duration of the first AV data winds down and becomes equal to a predetermined duration that is preset in a reproduction apparatus. The graphics plane controller 407 driven by the navigation manager 403 updates a graphics plane on which data has yet to be output so that the graphics plane has a color preset in the reproduction apparatus at the point of time when reproduction of the first AV data ends, thereby fading out the video output. The volume-level controller 408 fades out the volume of the audio output for a predetermined duration so that the volume-level is 0 at the point of time when reproduction of the first AV data ends at operation 704.

The navigation manager 403 starts reproduction of the second AV data based on the reproduction sequence information at operation 706. In order to obtain a sufficient duration of time required to read out the second AV data to the buffer 402, the video decoder 405 and the audio decoder 406 should be controlled to stop decoding video data and audio data while the graphics plane controller 407 is controlled for a predetermined duration before starting reproduction of the second AV data after reproduction of the first AV data. That is, it is possible to allow a color to be output for the predetermined duration via the graphics plane 410 at the point of time when reproduction of the first AV data ends. When reproduction of the second AV data begins, the graphics plane controller 407 fades in the video output by updating the graphics plane 410 to achieve the fading-in effect in the color, which is set in the reproducing apparatus, for a predetermined duration at operation 708. If the predetermined duration lapses after starting the reproduction of the second AV data, no data is output on the graphics plane 410. Additionally, the volume-level controller 408 fades in the volume of the audio output for a predetermined duration to obtain a default audio output at a predetermined time after starting the reproduction of the second AV data at operation 708.

Selected scenes or a plurality of pieces of AV data are reproduced sequentially, randomly, or in an order that a user determines, and operations 702, 704, 706 and 708 are performed to switch from one discontinuous scene or piece of discontinuous AV data to another, from among a plurality of discontinuous scenes or pieces of discontinuous AV data.

According to aspects of the present invention, the above method can be embodied as computer readable code in a computer readable recording medium. The computer readable recording medium is any data storage device that can store data which can be thereafter read by a computer system. Examples of computer readable recording media include read-only memory (ROM), random-access memory (RAM), CD-ROMs, magnetic tapes, floppy disks, optical data storage devices, and a computer data signal embodied in a carrier wave including a compression source code segment and an encryption source code segment (such as data transmission through the internet). The computer readable recording medium can also be distributed over network coupled computer systems so that the computer readable code is stored and executed in a distributed fashion.

As described above, the apparatus and method according to aspects of the present invention make it possible to provide a user with a better viewing and listening environment by smoothly processing video and audio during a switch from one scene or piece of AV data to another, selected from among a plurality of scenes or pieces of AV data.

Also, the scene change effect, such as fading-in and fading-out, is achieved by using a graphics plane instead of using a video plane during a switch from one discontinuous scene to another, selected by a user from among a plurality of scenes. Therefore, it is possible to easily achieve the scene change effect on a video plane on which video data is being output, without using a complicated color application algorithm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing audio-video (AV) data, the method comprising:
   identifying, within metadata, search keyword information that matches an input keyword;
   identifying AV data, among a plurality of AV data items, corresponding to the identified search keyword information;
   reproducing the identified AV data; and
   fading out the reproduced AV data for a first predetermined duration before ending reproduction of the identified AV data, wherein:
   the fading out of the identified AV data comprises visual and audio fading out,
   the visual fading out of the reproduced AV data comprises fading out a video output from a video plane by increasing the opacity of a graphics plane covering the video plane during the first predetermined duration, and
   the audio fading out of the reproduced AV data comprises fading out volume from an audio output by controlling the audio output to decrease a volume level for a second predetermined duration before the reproduction of the identified AV data ends.

2. The method of claim 1, wherein the metadata comprises search keyword information and entry point information for each of the AV data items.

3. The method of claim 2, wherein the search keyword information comprises keywords according to scene type, character name, or actor name.

4. The method of claim 1, wherein the fading out of the video output comprises gradually reducing transparency of the graphics plane so that the graphics plane becomes opaque at a point of time when the reproduction of the identified AV data ends.

5. The method of claim 1, wherein the AV data items are discontinuous from each other.

6. The method of claim 1, further comprising:
   generating reproduction sequence information comprising a location or reproduction duration of the identified AV data, wherein the identified AV data is reproduced based on the reproduction sequence information.

7. The method of claim 6, wherein the identified AV data is continuously reproduced.

8. A method of reproducing audio-video (AV) data, the method comprising:
identifying, within metadata, search keyword information that matches an input keyword;
identifying AV data corresponding to the identified search keyword information;
reproducing the identified AV data; and
fading in the reproduced AV data for a first predetermined duration after beginning reproduction of the identified AV data, wherein:
the fading in of the reproduced AV data comprises visual and audio fading in,
the visual fading in of the reproduced AV data comprises fading in a video output from a video plane by decreasing the opacity of a graphics plane covering the video plane during the first predetermined duration, and
the audio fading in of the reproduced AV data comprises fading in volume from an audio output by controlling the audio output to increase a volume level for a second predetermined duration after the beginning of the reproduction of the identified AV data.

9. The method of claim 8, wherein the fading in of the video output comprises gradually increasing transparency of the graphics plane so that no data is output on the graphics plane when the first predetermined duration lapses after the beginning of the reproduction of the identified AV data.

10. An apparatus for reproducing pieces of audio-video (AV) data, the apparatus comprising:
a searching unit configured to identify, within metadata, search keyword information that matches an input keyword and identify AV data items, among a plurality of AV data items, corresponding to the identified search keyword information;
a navigation manager configured to interpret reproduction sequence information of the identified AV data items and to control reproduction of the identified AV data items based on the interpreted reproduction sequence information;
a video decoder, controlled by the navigation manager, configured to decode video data included in the identified AV data items;
a graphic decoder, controlled by the navigation manager, configured to decode graphic data included in the identified AV data items;
an AV renderer including a video plane configured to output the video data decoded by the video decoder and a graphics plane configured to output the graphic data decoded by the graphic decoder, the graphics plane covering the video plane;
a graphics plane controller configured to:
fade out the reproduction of a first of the identified AV data items for a first predetermined duration before reproduction of the first identified AV data item ends, the fading out comprising visual fading out and audio fading out,
reproduce, after reproduction of the first identified AV data item ends, a second of the identified AV data items, and
fade in the reproduction of the second of identified AV data item after reproduction of the second identified AV data item begins for a second predetermined duration, the fading in comprising visual fading in and audio fading in, wherein:

the visual fading out and visual fading in of the first and second identified AV data items comprises fading out and fading in video output from the video plane by increasing the opacity of the graphics plane covering the video plane during the first predetermined duration and decreasing the opacity of the graphics plane during the second predetermined duration; and
the audio fading out and audio fading in of the first and second identified AV data items comprises decreasing audio volume for a third predetermined duration before the reproduction of the first identified AV data item ends and increasing the audio volume for a fourth predetermined duration after the reproduction of the second identified AV data item begins.

11. The apparatus of claim 10, wherein the first and second identified AV data items are discontinuous from each other.

12. The apparatus of claim 10, wherein the searching unit is further configured to generate the reproduction sequence information of the identified AV data items.

13. The apparatus of claim 12, wherein the reproduction sequence information comprises information regarding locations or reproduction durations of the identified AV data items.

14. The apparatus of claim 12, wherein the searching unit identifies the AV data items using metadata corresponding to the AV data items.

15. The apparatus of claim 14, wherein the metadata comprises search keyword information and entry point information for each AV data item.

16. The apparatus of claim 15, wherein the search keyword information comprises keywords according to scene type, character name, or actor name.

17. The apparatus of claim 12, wherein after the searching unit generates the reproduction sequence information, the searching unit is controlled to reproduce the identified AV data items sequentially, randomly, or in an order determined by a user.

18. The apparatus of claim 10, wherein the first and second identified AV data items are continuously reproduced.

19. The apparatus of claim 10, further comprising:
an audio decoder, controlled by the navigation manager, configured to decode audio data included in the identified AV data items and to output an audio output based on the decoded audio data.

20. The apparatus of claim 10, wherein the graphics plane controller gradually reduces transparency of the graphics plane so that the graphics plane becomes opaque at a point of time when the reproduction of the first identified AV data item end and gradually increases the transparency so that no data is output on the graphics plane upon the expiration of the second predetermined duration after the reproduction of the second identified AV data item begins.

21. The apparatus of claim 10, further comprising:
a reading unit; and
a buffer configured to store data read out by the reading unit, wherein
the navigation manager controls the reading unit to read out the second identified AV data item from an information storage medium to the buffer and controls the buffer to store the read out AV data for a fifth predetermined duration after the reproduction of the first identified AV data item ends and before the reproduction of the second identified AV data item begins.

22. A method of reproducing audio-video (AV) data, the method comprising:
identifying, within metadata, search keyword information that matches an input keyword;

identifying AV data items, among a plurality of AV data items, corresponding to the identified search keyword information;

reproducing a first of the identified AV data items;

fading out the reproduction of the first identified AV data item for a first predetermined duration before ending reproduction of the first identified AV data item, the fading out comprising visual and audio fading out;

reproducing, after reproduction of the first identified AV data item ends, a second of the identified AV data items; and fading in reproduction of the second identified AV data item after reproduction of the second identified AV data item begins for a second predetermined duration, the fading in comprising visual and audio fading in, wherein:

the visual fading out and visual fading in of the first and second identified AV data items comprises fading out and fading in video output from a video plane by increasing the opacity of a graphics plane covering the video plane during the first predetermined duration and decreasing the opacity of the graphics plane during the second predetermined duration, the audio fading out comprises fading out audio volume from an audio output by controlling the audio output to decrease a volume level for a third predetermined duration before the reproduction of the first identified AV data item ends, and the audio fading in comprises fading in volume from the audio output by controlling the audio output to increase the volume level for a fourth predetermined duration after the beginning of the reproduction of the second identified AV data item.

23. The method of claim 22, further comprising:

decoding the first identified AV data item, wherein decoding of the first identified AV data item is stopped for a predetermined duration before beginning reproduction of the second identified AV data item.

* * * * *